United States Patent
McKinnon et al.

(10) Patent No.: US 10,093,432 B2
(45) Date of Patent: Oct. 9, 2018

(54) DRONE RECEIVING SYSTEMS AND METHODS

(71) Applicants: James McKinnon, Rye, NY (US); Frederick J. Onorato, Westport, CT (US)

(72) Inventors: James McKinnon, Rye, NY (US); Frederick J. Onorato, Westport, CT (US)

( * ) Notice: Subject to any disclaimer, the term of this patent is extended or adjusted under 35 U.S.C. 154(b) by 265 days.

(21) Appl. No.: 14/877,819

(22) Filed: Oct. 7, 2015

(65) Prior Publication Data

US 2016/0101874 A1 Apr. 14, 2016

Related U.S. Application Data

(60) Provisional application No. 62/062,014, filed on Oct. 9, 2014.

(51) Int. Cl.
*B64F 1/00* (2006.01)
*A47G 29/14* (2006.01)

(52) U.S. Cl.
CPC .............. *B64F 1/007* (2013.01); *A47G 29/14* (2013.01); *B64C 2201/027* (2013.01); *B64C 2201/128* (2013.01)

(58) Field of Classification Search
CPC .............. B64F 1/007; B64C 2201/027; B64C 2201/128; A47G 29/14; A47G 29/12097
See application file for complete search history.

(56) References Cited

U.S. PATENT DOCUMENTS

| | | | | |
|---|---|---|---|---|
| 399,491 | A * | 3/1889 | Bukawietis | A47L 3/02 182/62 |
| 430,971 | A * | 6/1890 | Reed | A47L 3/02 182/61 |
| 1,512,792 | A * | 10/1924 | Nelson | A47L 3/02 182/113 |
| 1,575,241 | A * | 3/1926 | Williams | A47D 7/04 5/10.1 |
| 1,627,241 | A * | 5/1927 | Johnson | A47B 5/04 182/58 |
| 1,658,942 | A * | 2/1928 | Renstrom | A47L 3/02 182/61 |
| 1,733,485 | A * | 10/1929 | Desrosiers | D06F 57/12 211/94.03 |

(Continued)

FOREIGN PATENT DOCUMENTS

| | | | | |
|---|---|---|---|---|
| DE | 102013004881 A1 * | 9/2014 | | H02J 7/0027 |
| WO | WO-2008016311 A2 * | 2/2008 | | B60B 19/003 |
| WO | WO-2016196093 A1 * | 12/2016 | | G06Q 10/083 |

*Primary Examiner* — Stanton L Krycinski
(74) *Attorney, Agent, or Firm* — Cionca IP Law P.C.; Marin Cionca

(57) ABSTRACT

A drone receiving system having a tray configured to function as a landing pad for the drone delivering a package as well as a nest for the package, wherein the tray is associated with at least a mounting arm for mounting the drone receiving system to an outside of a structure, wherein the at least a mounting arm is expandable to move the tray away from the structure, so that the drone can deliver the package without being obstructed by the structure, and wherein the at least a mounting arm is retractable to move the tray after package delivery toward the structure, so that the package can be unloaded from the tray from inside the structure.

10 Claims, 5 Drawing Sheets

(56) References Cited

U.S. PATENT DOCUMENTS

| | | | | |
|---|---|---|---|---|
| 2,059,115 | A * | 10/1936 | Kay | A47L 3/02 |
| | | | | 182/61 |
| 2,568,968 | A * | 9/1951 | Perrin | E04G 3/18 |
| | | | | 248/236 |
| 2,935,284 | A * | 5/1960 | Reeves | E04G 3/18 |
| | | | | 248/208 |
| 3,857,365 | A * | 12/1974 | Mueller | A01K 1/0353 |
| | | | | 119/28.5 |
| 4,869,451 | A * | 9/1989 | Gordon | A47H 27/00 |
| | | | | 248/235 |
| 5,351,648 | A * | 10/1994 | Elesh | A01K 1/035 |
| | | | | 119/28.5 |
| 5,738,319 | A * | 4/1998 | Grassi | A47G 7/044 |
| | | | | 248/215 |
| 6,360,689 | B1 * | 3/2002 | Weinert | A01K 1/033 |
| | | | | 119/475 |
| 7,410,125 | B2 * | 8/2008 | Steele | B64F 1/02 |
| | | | | 244/110 C |
| 7,874,529 | B2 * | 1/2011 | Klemm | A47B 97/00 |
| | | | | 248/126 |
| 8,091,844 | B1 * | 1/2012 | Bragg | F24F 13/32 |
| | | | | 248/208 |
| 9,179,794 | B2 * | 11/2015 | Darby | A47H 27/00 |
| 9,701,425 | B2 * | 7/2017 | Lee | B64F 1/222 |
| 9,909,712 | B1 * | 3/2018 | Darby | F16M 13/022 |
| 2006/0249623 | A1 * | 11/2006 | Steele | B64F 1/02 |
| | | | | 244/116 |
| 2008/0134430 | A1 * | 6/2008 | Kirmon | A01K 1/035 |
| | | | | 5/10.1 |
| 2011/0174925 | A1 * | 7/2011 | Ying | B64F 1/005 |
| | | | | 244/114 R |
| 2012/0271491 | A1 * | 10/2012 | Spata | G01W 1/00 |
| | | | | 701/3 |
| 2015/0034784 | A1 * | 2/2015 | Darby | A47H 27/00 |
| | | | | 248/236 |
| 2015/0158599 | A1 * | 6/2015 | Sisko | B64F 1/32 |
| | | | | 244/114 R |
| 2015/0175276 | A1 * | 6/2015 | Koster | B64F 1/32 |
| | | | | 244/114 R |
| 2015/0183528 | A1 * | 7/2015 | Walsh | B64F 1/32 |
| | | | | 701/3 |
| 2016/0068264 | A1 * | 3/2016 | Ganesh | G08G 5/0069 |
| | | | | 701/2 |
| 2017/0032686 | A1 * | 2/2017 | Alonso Tabares | G08G 5/0091 |
| 2017/0158353 | A1 * | 6/2017 | Schmick | B64F 1/007 |
| 2017/0203857 | A1 * | 7/2017 | O'Toole | B64F 1/32 |

* cited by examiner

DRONE RECEIVING SYSTEMS AND METHODS

CROSS-REFERENCE TO RELATED APPLICATIONS

This application claims the benefit of U.S. Provisional Application No. 62/062,014, filed Oct. 9, 2014, which is hereby incorporated by reference, to the extent that it is not conflicting with the present application.

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX

Not Applicable

BACKGROUND OF THE INVENTION

1. Field of the Invention

The invention relates generally to drone-based package delivery systems and methods and more particularly to a platform and method for safe and secure delivery of packages via drones at residential and commercial addresses.

2. Description of the Related Art

In the future, drones or quad copters will be used to deliver products from main distribution hubs to commercial and residential addresses. The use of drones or quad copters for distribution will be encouraged because it reduces traffic, speeds up delivery, is better for the environment (no fossil fuel use) and is a less expensive alternative to manned delivery trucks of today's delivery or courier services (for example, FedEx™ DHL™ USPS™ and UPS™). Currently, it appears that there is no company, product or solution to reliably address the need for how the cargo will be received by the customer in a safe and secure manner. The drones themselves are feasibly able to pick up and secure the cargo from a distribution center, but once the cargo is in route, how does is it securely and reliably deliver products to their intended recipients in a secure manner and location?

Thus, there is a need to address and solve the above problem.

The problems and the associated solutions presented in this section could be or could have been pursued, but they are not necessarily approaches that have been previously conceived or pursued. Therefore, unless otherwise indicated, it should not be assumed that any of the approaches presented in this section qualify as prior art merely by virtue of their presence in this section of the application.

BRIEF SUMMARY OF THE INVENTION

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

In an exemplary embodiment a drone receiving system is provided having a tray configured to function as a landing pad for the drone delivering a package as well as a nest for the package, wherein the tray is associated with at least a mounting arm for mounting the drone receiving system to an outside of a structure, wherein the at least a mounting arm is expandable to move the tray away from the structure, so that the drone can deliver the package without being obstructed by the structure, and wherein the at least a mounting arm is retractable to move the tray after package delivery toward the structure, so that the package can be unloaded from the tray from inside the structure.

In another exemplary embodiment, a solution is provided including a drone receiving system (DRS Nest) having a landing pad or "landing nest" to safely and securely receive deliveries/packages that are delivered by drone or quad copter to a residential or commercial property. The DRS Nest can be secured to a structure at an elevated location for security purposes. The DRS Nest is designed to communicate with delivery drones for the landing, assist in the transfer of cargo, and departure of the drone, complete with a sensor acknowledging receipt of package or an image (or video) with proof of delivery.

The above embodiments and advantages, as well as other embodiments and advantages, will become apparent from the ensuing description and accompanying drawings.

BRIEF DESCRIPTION OF THE DRAWINGS

For exemplification purposes, and not for limitation purposes, embodiments of the invention are illustrated in the figures of the accompanying drawings, in which.

DETAILED DESCRIPTION OF THE PREFERRED EMBODIMENTS

Figure 1:
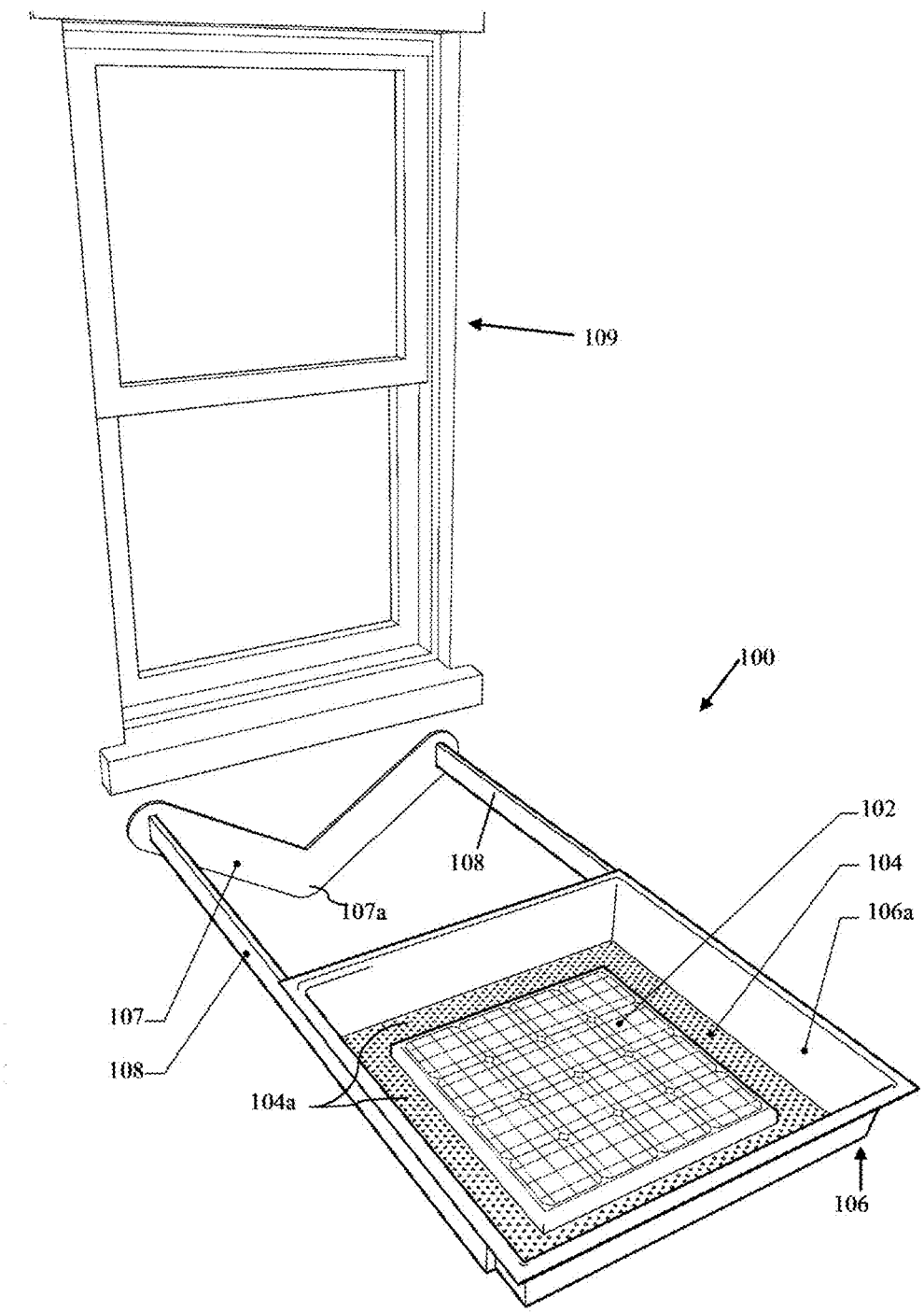
FIG. 1 illustrates a top perspective view of a drone receiving system installed under a window, according to an embodiment.

What follows is a detailed description of the preferred embodiments of the invention in which the invention may be practiced. Reference will be made to the attached drawings, and the information included in the drawings is part of this detailed description. The specific preferred embodiments of the invention, which will be described herein, are presented for exemplification purposes, and not for limitation purposes. It should be understood that structural and/or logical modifications could be made by someone of ordinary skills in the art without departing from the scope of the invention. Therefore, the scope of the invention is defined by the accompanying claims and their equivalents.

For the following description, it can be assumed that most correspondingly labeled elements across the figures (e.g., 106 and 206, etc.) possess the same characteristics and are subject to the same structure and function. If there is a difference between correspondingly labeled elements that is not pointed out, and this difference results in a non-corresponding structure or function of an element for a particular embodiment, then the conflicting description given for that particular embodiment shall govern.

FIG. 1 illustrates a top perspective view of a drone receiving system installed under a window, according to an embodiment. As shown, the drone receiving system 100 may have a tray or trough 106 for receiving a package delivered by a drone, as it will be described in detail hereinafter. The tray 106 may be manufactured for example by bending aluminum sheets, by injecting plastic into a mold, or by using any other suitable processes and materials known in the art. A rectangular shape (e.g., square) of the tray 106 is preferred as shown given that most packages come in rectangular boxes. In the rectangular shape shown, the tray 106 has a bottom 104 and four lateral walls 106a. However, other shapes (e.g., circular) may be adopted for the tray 106. The tray 106 may have a perforated bottom 104 to allow for example rain water to pass through and thus keep the tray dry and avoid water damage to a received package.

The drone receiving system 100 may also have a solar panel 102 for supplying power to a rechargeable battery and signaling and communication components described hereinafter when referring to FIG. 2. As shown, the solar panel 102 is preferably positioned onto the upper side of tray bottom 104 so that the solar panel 102 is exposed to sunlight during the day when there is no package in the tray 106. Preferably, as shown, the solar panel is positioned centrally onto the tray bottom 104, such that to leave an exposed/landing area 104a of the tray bottom 104 around the solar panel 102, for receiving the landing gears 425a (FIG. 4) of a drone 425, and thus facilitate the landing of the drone 425 delivering a package 426. The rest of the tray bottom 104, substantially the one corresponding to the solar panel 102, may be the package area reserved for receiving the package 426. Thus, the tray 106 functions as a landing pad for the drone 425 as well as a nest for the delivered package 426.

The tray 106 is preferably connected to a structure, such as a house, an apartment building or an office building, for reasons that would be apparent from the ensuing description. To accomplish this, as shown, the tray 106 may be associated with mounting arm(s) 108, which may be further associated with a mounting bracket 107. In a preferred aspect, the mounting bracket 107 may have a V-shape as shown, or other equivalent shapes (e.g., semicircle), in which a portion 107a lower than the mounting arms 108 is provided, for counterbalancing some of the weight of the tray 106 and/or the package received in it. As it will be explained in more detail hereinafter when referring to FIGS. 2-5, the mounting arm(s) 108 (which could be one, two as shown, or any other suitable plurality) are preferably expandable and retractable, as necessary to accommodate the landing of drone 425 and the unloading of package 426, 526, respectively.

Figure 5:
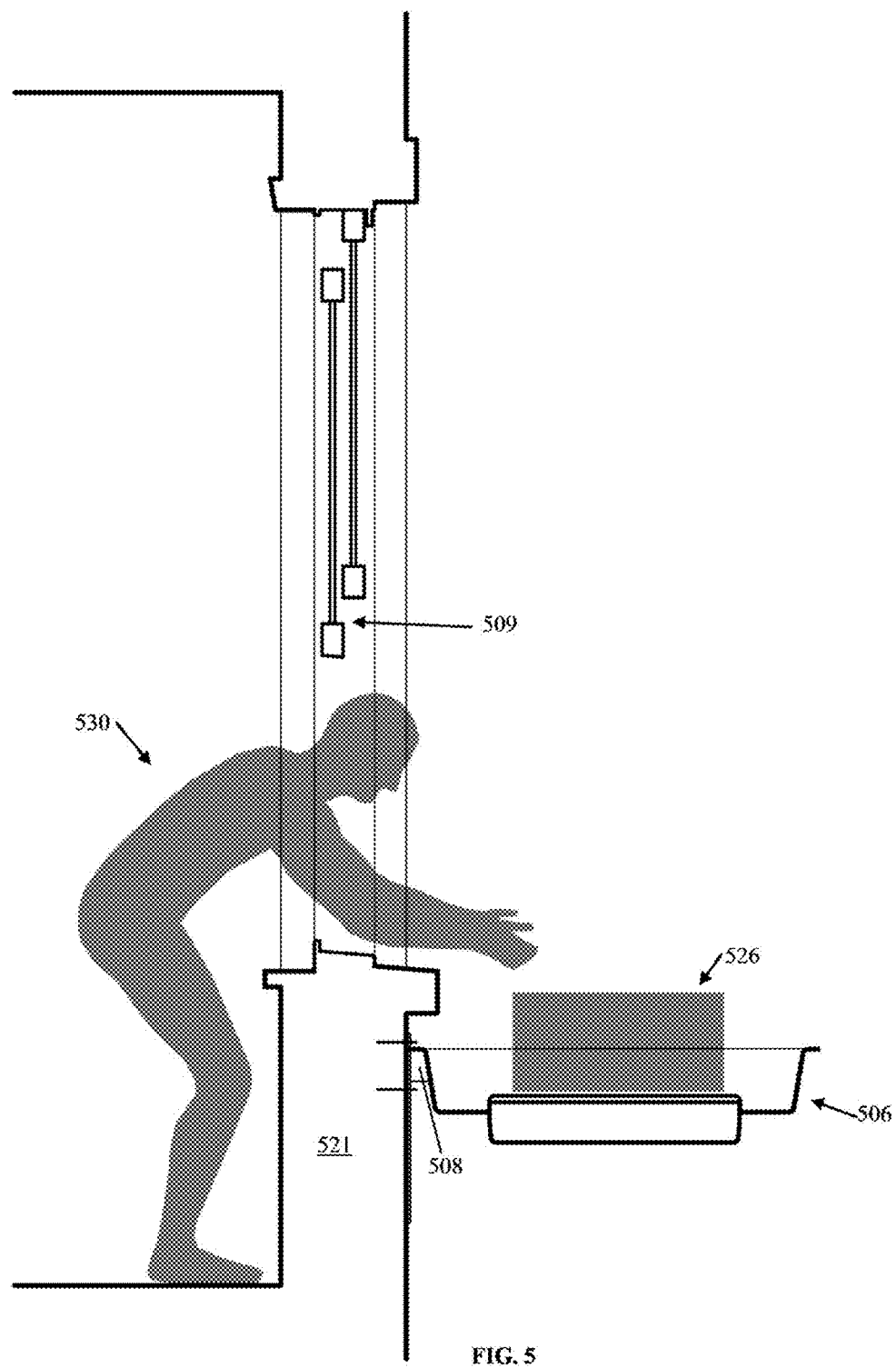
FIG. 5 illustrates a sectional view of the drone receiving system from FIG. 1 in a package unloading mode, according to an embodiment.

One benefit of mounting the drone receiving system 100 to a structure is that it provides a fixed and constant location, which facilitates landing of drone 425. In a preferred aspect, the drone receiving system 100 is mounted as shown under a window 109 of a house, office or apartment building, or the like. As shown in FIG. 5, this mounting location makes it easy and convenient (e.g., without the need to step out into the cold) for a person to retrieve the package from the tray 106, 506. In an even more preferred aspect, the drone receiving system 100 is mounted under an upper level (i.e., second or higher level) window 109. That would be a more secure location, as it would be more difficult for a would be thief to steal the package 426. Other high elevation structures or locations may be employed, such as a balcony, if at second or higher level.

The higher elevation security of the cargo/package 426 described above may be supplemented by a locking mechanism (not shown), which may include for example an automatically closing and locking cover that would cover the package 426 after release in tray 106, and protect it from for example rain and thieves. It should be observed that when such a locking mechanism is used, the drone receiving system 100 may be mounted on lower elevation structures such as a fence and the package 426 would still be secured.

Figure 2:
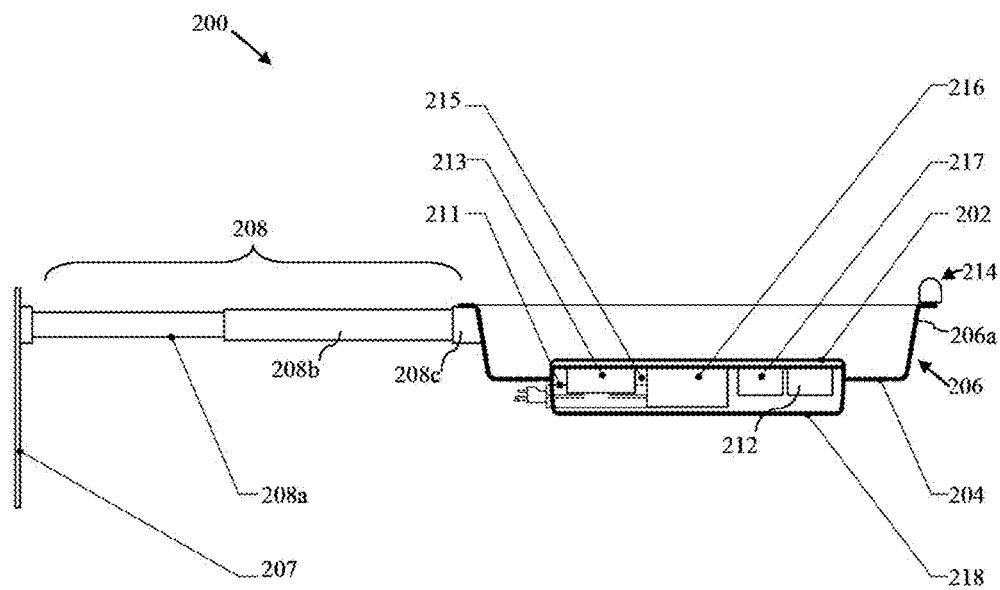
FIG. 2 illustrates a sectional view of the drone receiving system from FIG. 1.

FIG. 2 illustrates a sectional view of the drone receiving system from FIG. 1. As stated earlier, the mounting arm(s) 208 of the drone receiving system 200 is associated with a mounting bracket 207 and is expandable and retractable. As shown in FIG. 2, one way to achieve this is by employing a telescopic structure having for example three telescopic elements 208a-c of various cross-section sizes, such that, during a retraction, the elements having smaller cross-section can slide inside the element having a greater cross-section.

As shown in FIG. 2, the drone receiving system 200 preferably has a weatherproof box 218 positioned for example below the solar panel 202, to house a retractable cord 211 and power adapter 216, a strobe light fuse box 213, a Wi-Fi and/or GPS transmitter 215, a transceiver 217 and a battery 212. It should be noted that the top of weatherproof box 218 and solar panel 202 sits preferably higher than the perforated bottom 204 to aid in preventing water damage to solar panel 202 and the components housed by the weatherproof box 218. It should be also noted that the lateral walls 206a of the tray 206 are sloped outwardly to facilitate the release of package 426 by drone 425 into tray 206.

Preferably, drones (425 in FIG. 4) and drone receiving system 200 are able to communicate and identify each other's ID signal through a two-way communication module including for example a Global Positioning System (GPS) and/or Wi-Fi transmitter/transceiver 215, and/or a strobe light 214 and strobe light locator (not shown), such that for example an approaching drone 425 can directly identify the drone receiving system 200 and its tray/landing pad 206. The two-way communication module may be configured to for example assist/guide the drone 425 in locating the exact location of the drone receiving system 200, instruct the drone 425 to release the cargo/package 426 into tray 206, and acknowledge receipt of the cargo/package 426. If there is any error, the drone receiving system 200 may be configured to be able to signal via for example text/email or call to for example check the status of the delivery or if maintenance is required.

The drone receiving system 200 may also be configured to communicate to the customer who has received the cargo, the transportation/delivery/courier service or company (e.g., FedEx™, UPS™) and/or the manufacturer/seller/distributor (e.g., Amazon™ or Wal-Mart™) who has sold the cargo, a delivery confirmation complete with receipt that is time stamped, includes location data and/or a picture of the delivered package sitting in tray 206. The picture may be taken from an onboard drone camera for example (not shown).

The two-way communication hub/module, which again may include the GPS and/or Wi-Fi transmitter/transceiver 215, and/or the strobe light 214, can help guide the drone 425 to the location of the drone receiving system 200 in various weather and night conditions.

A smartphone app (for a mobile device such as an iPhone™, Android™, Amazon Fire™, etc.) may be provided that controls for example an interface of the drone receiving system 200, an alert system and/or a delivery tracking system.

The drone receiving system 200 may be equipped to include for example temperature controlled (hot or cold climate control) receiving means to be employed for example, for delivery of pizza (hot) or beer (cold). Air conditioning units and/or heating elements known in the art may be used. The power source of the drone receiving system 200 may be AC power received through retractable cord 211, solar power from solar panel 202, or a combination thereof.

A video surveillance unit known in the art may also be added to the drone receiving system 200 to for example deter would-be thieves or track delivery of package 426. The video surveillance unit may for example be a webcam configured to communicate with a smartphone of the package sender or receiver.

Figure 3:
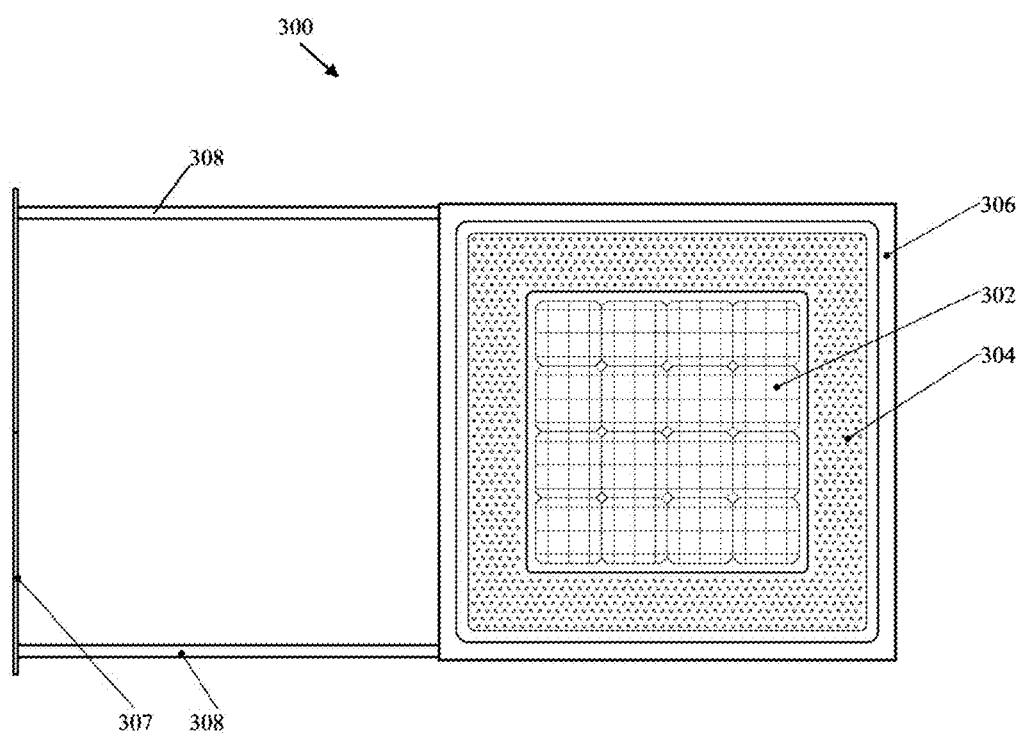
FIG. 3 illustrates a top view of the drone receiving system from FIG. 1.

FIG. 3 illustrates a top view of the drone receiving system from FIG. 1. As described hereinbefore, the drone receiving system 300 disclosed herein may have two expandable/retractable mounting arms 308 associated with a mounting bracket 307 for mounting to a structure, such as the outside of an exterior wall of a house. As shown, each of the two mounting arms may be associated with one of the two opposing sides of the tray 306. The solar panel's 306 preferred position in relation to the perforated tray bottom 304 can more clearly be seen in this figure.

Figure 4:
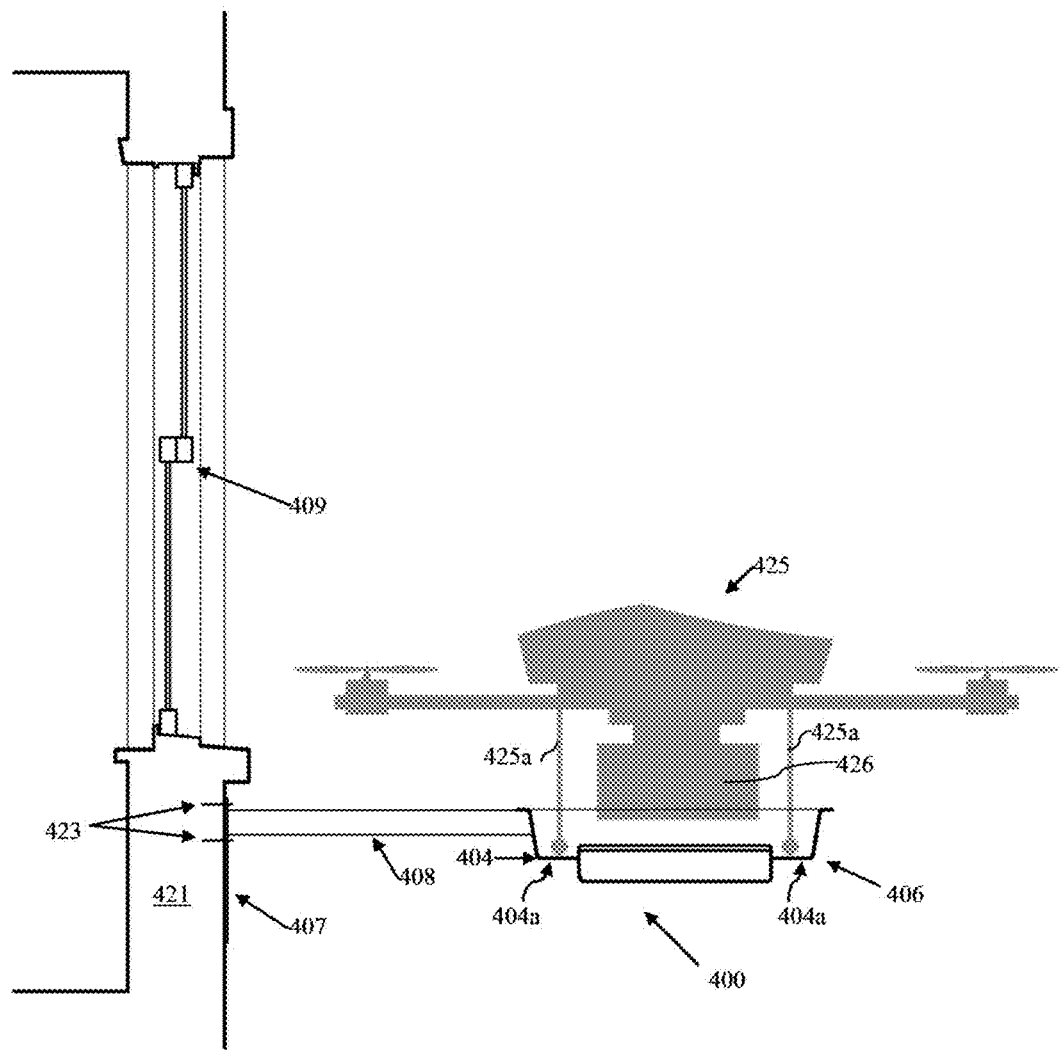
FIG. 4 illustrates a sectional view of the drone receiving system from FIG. 1 in a drone and package receiving mode, according to an embodiment.

FIG. 4 illustrates a sectional view of the drone receiving system from FIG. 1 in a drone and package receiving mode, according to an embodiment. As described hereinbefore, the drone receiving system 400 may have an exposed/landing area 404a of the bottom 404 of the tray 406 for receiving the landing gears 425a of the package/cargo delivery drone 425. After landing, the cargo/package 426 can simply be released into the tray 406.

Again, it should be noted in FIG. 4 that during the delivery of the cargo/package 426, the extendable/retractable mounting arms 408 are in an extended position to provide the distance necessary for safe landing between the drone or quadcopter 425 and the structure the drone receiving system 400 is attached to (e.g., wall 421).

As stated hereinbefore, a preferred location to mount the drone receiving system 400 is under a window 409. The mounting bracket 407 may be secured to the wall 421 below the window 409 by any suitable means known in the art, such as by example using screws/bolts 423.

FIG. 5 illustrates a sectional view of the drone receiving system from FIG. 1 in a package unloading mode, according to an embodiment. It should be noted in this figure that after the package 526 was delivered to tray 506, the mounting arms 508 are retracting bringing the tray 506 and package/cargo 526 closer to the wall 521 and window 509 for easy unloading. A person 530 would need to simply open the window 509 from inside the house and take the package 526 out of the tray 506. Again, this is advantageous as it eliminates the need to step out of the house in a cold day for example to retrieve the package. Further, when at higher elevation (e.g., second or third floor) it is also secure as it discourages would-be thieves.

As described hereinbefore, the expandable/retractable mounting arms 508 may be for example telescopic. Other approaches known in the art may be used, such as for example by using foldable structural elements such as the X-shaped pieces used in common foldable chairs. It should be understood that the mounting arms 508 can be expanded or retracted/folded manually or using motorized/automatic mechanisms known in the art. As an example of manual operation, a rod with a hook at the distal end (not shown) can be used by a person 530 to drag the tray 506 containing package 526 toward window 509. After taking the package 526 out of the tray 506, the person may simply push back the tray 506, away from the window 509, extending the mounting arms 508 and thus positioning the tray 506 to be ready to receive the next package.

It may be advantageous to set forth definitions of certain words and phrases used in this patent document. Additional definitions are set forth throughout the detailed description. The term "drone" refers to any drone, quadcopter or other similar flying apparatus that can transport and deliver a package or cargo. The term "couple" and its derivatives refer to any direct or indirect communication between two or more elements, whether or not those elements are in physical contact with one another. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

As used in this application, "plurality" means two or more. A "set" of items may include one or more of such items. Whether in the written description or the claims, the terms "comprising," "including," "carrying," "having," "containing," "involving," and the like are to be understood to be open-ended, i.e., to mean including but not limited to. Only the transitional phrases "consisting of" and "consisting essentially of," respectively, are closed or semi-closed transitional phrases with respect to claims. Use of ordinal terms such as "first," "second," "third," etc., in the claims to modify a claim element does not by itself connote any priority, precedence or order of one claim element over another or the temporal order in which acts of a method are performed. These terms are used merely as labels to distinguish one claim element having a certain name from another element having a same name (but for use of the ordinal term) to distinguish the claim elements. As used in this application, "and/or" means that the listed items are alternatives, but the alternatives also include any combination of the listed items.

Throughout this description, the embodiments and examples shown should be considered as exemplars, rather than limitations on the apparatus and procedures disclosed or claimed. Although many of the examples involve specific combinations of method acts or system elements, it should be understood that those acts and those elements may be combined in other ways to accomplish the same objectives.

Although specific embodiments have been illustrated and described herein for the purpose of disclosing the preferred embodiments, someone of ordinary skills in the art will easily detect alternate embodiments and/or equivalent variations, which may be capable of achieving the same results, and which may be substituted for the specific embodiments illustrated and described herein without departing from the scope of the invention. Therefore, the scope of this application is intended to cover alternate embodiments and/or equivalent variations of the specific embodiments illustrated and/or described herein. Hence, the scope of the invention is defined by the accompanying claims and their equivalents.

Furthermore, each and every claim is incorporated as further disclosure into the specification and the claims are embodiment(s) of the invention.

What is claimed is:

1. A drone receiving system comprising a tray having a rectangular shape, a bottom comprising a plurality of perforations such that water cannot accumulate into the tray, four lateral walls extending upwards from the bottom, wherein each lateral wall of the four lateral walls is sloped away from a center of the bottom, a landing area having a first area for receiving one or more landing gears of a drone delivering a package, and a package area having a second area smaller than the first area for receiving the package delivered by the drone, the package area being elevated above the plurality of perforations, wherein the tray is associated with at least one mounting arm for mounting the drone receiving system to an outside of a structure, wherein the at least one mounting arm is expandable to move the tray away from the structure, so that the drone can deliver the package without being obstructed by the structure, and wherein the at least one mounting arm is retractable to move the tray after package delivery toward the structure, so that the package can be unloaded from the tray from inside the structure.

2. The drone receiving system of claim 1, wherein the at least one mounting arm is associated with a V-shaped mounting bracket attached to the structure for counterbalancing a portion of a weight of the tray and of the package received in the tray.

3. The drone receiving system of claim 2, wherein the at least one mounting arm is telescopic.

4. The drone receiving system of claim 3, further comprising a solar panel positioned onto an upper side of the bottom of the tray, so that the solar panel is exposed to sunlight during daytime when there is no package in the tray.

5. The drone receiving system of claim 4, further comprising a strobe light and a weatherproof box housing at least a member of a group consisting of a retractable cord, a power adapter, a strobe light fuse box, a Wi-Fi transmitter, a Global Positioning System (GPS) transmitter, a transceiver and a battery.

6. The drone receiving system of claim 5, wherein at least a member of a group consisting of the strobe light, the WI-FI transmitter and the GPS transmitter guide the drone during landing.

7. The drone receiving system of claim 1, wherein the structure is a house.

8. A drone receiving system comprising a tray configured to function as a landing pad for a drone delivering a package as well as a nest for the package, wherein the tray is associated with a first mounting arm on a first side of the tray and associated with a second mounting arm on a second side of the tray opposite to the first side; the drone receiving system further comprising a mounting bracket associated with the first mounting arm and the second mounting arm via a first attachment point and a second attachment point, the first attachment point and the second attachment point being on a first side of the mounting bracket, wherein the drone receiving system is adapted to mount the drone receiving system to an outside of a structure via a second side of the mounting bracket, the mounting bracket further comprising a third attachment point lower that the first attachment point and the second attachment point, wherein the first mounting arm and the second mounting arm are expandable to move the tray away from the structure, so that the drone can deliver the package without being obstructed by the structure, and wherein the first mounting arm and the second mounting arm are retractable to move the tray after package delivery toward the structure, so that the package can be unloaded from the tray from inside the structure.

9. The drone receiving system of claim 8, wherein the mounting bracket is V-shaped.

10. A drone receiving system, comprising:
a tray configured to function as a landing pad for a drone delivering a package and configured to function as a nest for the package by having:
  a perforated bottom surface having a first area, a rectangular shape, and a center, the perforated bottom surface being configured to function as the landing pad for landing gears of the drone;
  four lateral walls extending upwards from the perforated bottom surface, wherein each lateral wall of the four lateral walls is sloped away from the center of the perforated bottom surface;
  a solar panel having a second area smaller than the first area, and positioned centrally on the perforated bottom surface such that the landing area is exposed and borders the solar panel, wherein the solar panel is configured to supply power to the drone delivery system and to function as the nest for the package;
a plurality of mounting arms;
a mounting bracket for attaching the plurality of mounting arms to a wall of a structure, the mounting bracket having a first portion and a second portion, wherein the first portion is lower than the second portion when the mounting bracket is attached to the wall, such that a counterbalance to the tray and the package is provided;
wherein each mounting arm of the plurality of mounting arms is configured to be expandable and retractable such that the tray is movable towards or away from the wall;
wherein a first mounting arm of the plurality of mounting arms is associated with a first side of the tray, and a second mounting arm of the plurality of mounting arms is associated with a second side of the tray opposite of the first side; and
wherein the solar panel is positioned above the perforated bottom surface such that water is drained through the perforated bottom surface and damage to the solar panel is prevented.

* * * * *